US008059946B1

(12) United States Patent
Williams

(10) Patent No.: US 8,059,946 B1

(45) Date of Patent: Nov. 15, 2011

(54) CONCENTRATED THERMAL RADIATION TRANSFER SYSTEM FROM ELECTRICALLY PRODUCED SOURCE

(76) Inventor: John Cletus Williams, Dacula, GA (US)

( * ) Notice: Subject to any disclaimer, the term of this patent is extended or adjusted under 35 U.S.C. 154(b) by 458 days.

(21) Appl. No.: 12/290,357

(22) Filed: Oct. 30, 2008

(51) Int. Cl.
*A45D 20/40* (2006.01)
*A21B 2/00* (2006.01)

(52) U.S. Cl. ........................................ 392/407; 392/416

(58) Field of Classification Search ........................ None
See application file for complete search history.

(56) References Cited

U.S. PATENT DOCUMENTS

| | | | | | |
|---|---|---|---|---|---|
| 1,819,941 | A | * | 8/1931 | Brown | 604/114 |
| 3,813,514 | A | * | 5/1974 | Canty | 392/460 |
| 4,099,833 | A | * | 7/1978 | Tosswill | 385/43 |
| 5,293,437 | A | * | 3/1994 | Nixon | 385/115 |
| H1297 | H | * | 4/1994 | Partin et al. | 422/82.05 |
| 6,415,076 | B1 | * | 7/2002 | DeCusatis | 385/28 |
| 6,754,001 | B2 | * | 6/2004 | Burstyn | 359/333 |
| 7,020,388 | B2 | | 3/2006 | Mills | |
| 7,286,283 | B2 | * | 10/2007 | Starodoumov | 359/341.33 |

* cited by examiner

*Primary Examiner* — Thor Campbell

(57) ABSTRACT

Disclosed is a method and apparatus for concentrated thermal radiation heat transfer from an electrically produced source of light. Whereby, the electromagnetic energy is conveyed from the source through lens assemblies for collection and distribution. The concentrated thermal radiation can be utilized locally or remotely through optical fiber systems. It can be collected on metal or other collecting surfaces and can heat various mediums. The heated medium can then be transferred by way of ventilation, pumps. or natural dispersion. The concentrated heat can be utilized without the use of a collection surface directly into its surroundings. In this embodiment the light from the source can also be put to use without the need for optical fiber systems or other devices. The array of lens assembles and optical fiber systems can be molded together out of plastic, glass, or other materials to minimize the cost of manufacturing.

2 Claims, 3 Drawing Sheets

CONCENTRATED THERMAL RADIATION TRANSFER SYSTEM FROM ELECTRICALLY PRODUCED SOURCE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Technical Field of the Invention

The present invention relates to a means for transferring, concentrating, collecting and utilizing thermal radiation from an electrically produced light source.

2. Prior Art

A previous attempt to produce a heat transfer system using the heat emanating from a regular light bulb as in U.S. Pat. No. 7,020,388 issued to Mills, Mar. 28, 2006 appears to have limited practical use. This system can only use one layer of direct heat from the source. Using only the ambient temperature would provide a minimal amount of heat per watt of electricity used.

SUMMARY OF INVENTION

The present invention is to utilize thermal radiation from an electrically produced light source. This electromagnetic energy is concentrated through various lens assemblies which increases the temperatures conveyed form the source to local and remote locations. The use of optical fibers and cables can increase the amount of points of light that are utilized.

As long as electricity is available using a proper light source, our system is able to produce thermal radiation heat. It will work off a wide range of alternating and direct current voltages. Our apparatus will produce high outputs of BTU's per watt of electricity used. It can be used in both stationary and mobile situations.

It should therefore be seen that our system puts the thermal radiation produced from a generated light source to a different use. By concentrating this energy to achieve much greater results it would be a significant improvement over what has been known before.

REFERENCE NUMERALS

| | |
|---|---|
| 5 | base to supply voltage |
| 6 | light source |
| 7 | watchmakers loupe 10× magnification |
| 8 | Fresnel lens |
| 9 | heat collecting surface |
| 10 | fiber optics |
| 11 | fiber optic cable |
| 12 and 13 | remote collecting and utilization system |

DETAILED DESCRIPTION

Figure 1:
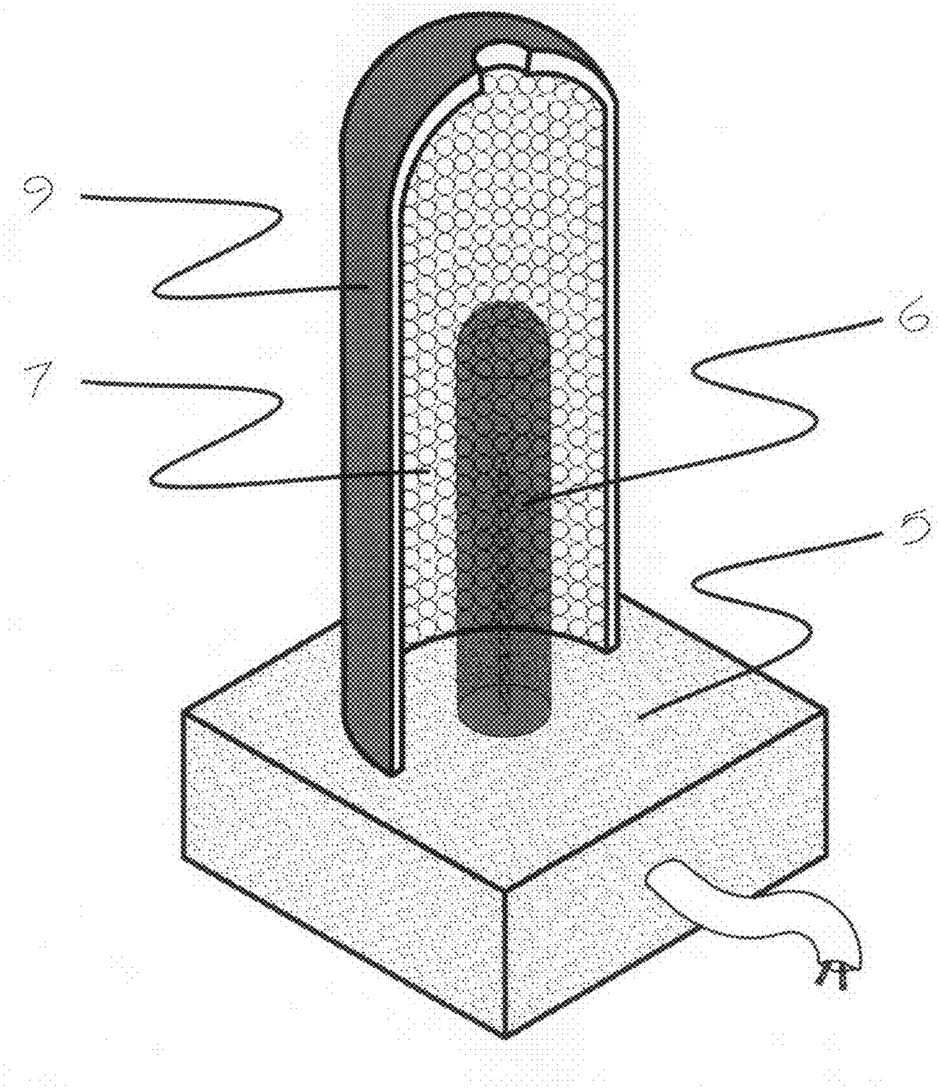
FIG. 1 illustrates a perspective view of the main concept of our apparatus.

FIG. 1 The thermal radiation producing light source 6 in this embodiment is a SteFan-Boltzman lamp. It is Pasco Scientific 2008 Physics catalog part number TD-8555. The lamp is supplied voltage from the base 5 which is 12 volts D.C. for the SteFan-Boltzman light bulb. A standard 12 volt automobile battery or a 12 volt D.C. power supply can provide this voltage. The light from the bulb is then concentrated through many assembled watchmakers' loupe 10× magnifications 1 in. working distance lenses 7 McMaster-Carr catalog 114 part number 8539T63. The lenses 7 are set at a distance from the light source 6 that provide optimum use of the focal point of the lens 7 to achieve highest concentration of light and heat.

The concentrated thermal radiation is then focused and transferred onto a surface 9 in this embodiment titanium is used for collection and utilization. The array of lenses encompasses the entire source or light.

Figure 2:
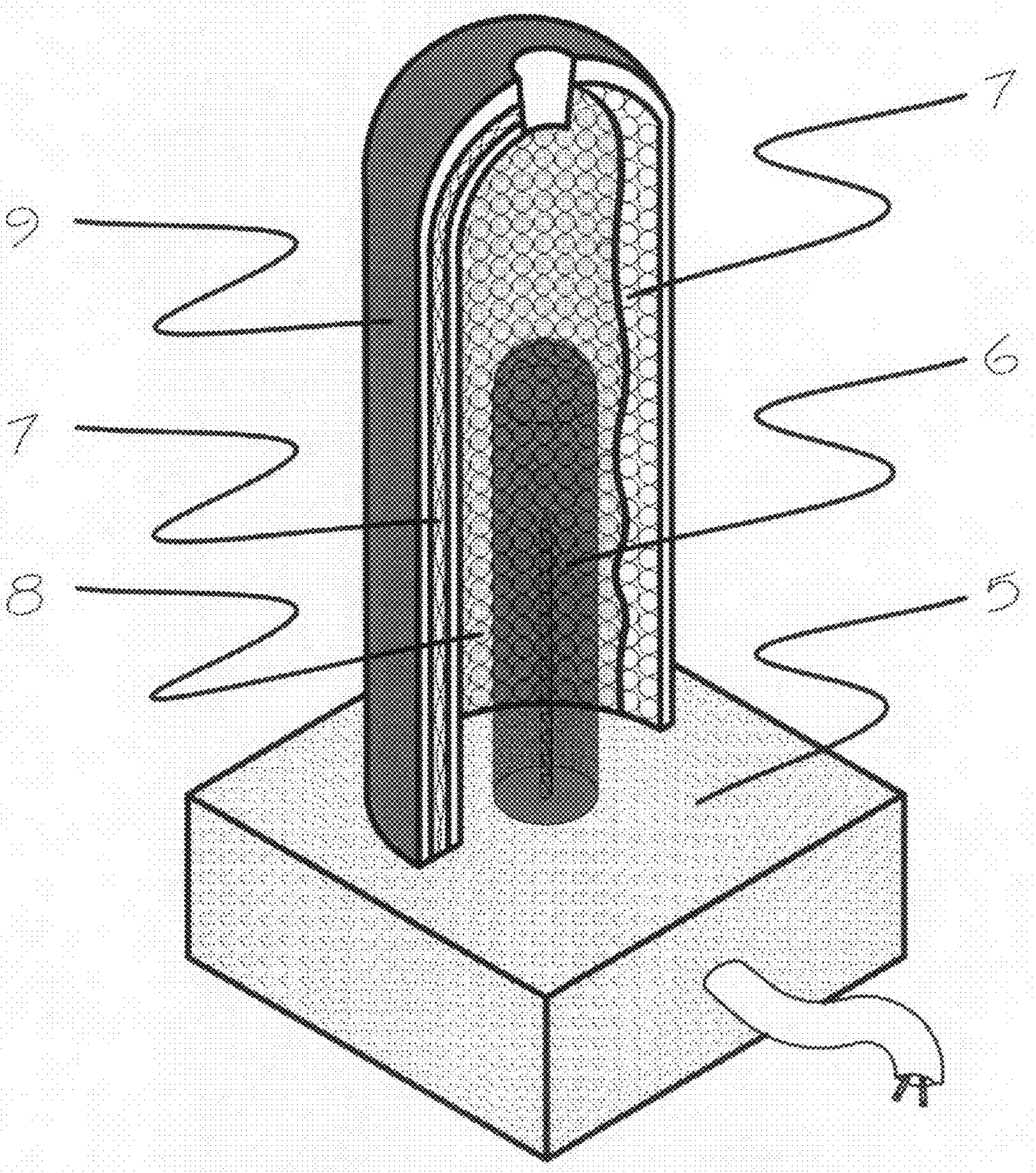
FIG. 2 illustrates a more advanced version of a lens system.

FIG. 2 The base 5 supplies the voltage to the thermal radiation producing light source 6. The thermal radiation is then concentrated through a Fresnel lens 8 Edmund Optics 2008 Catalog Part #43022 then further condensed through double lens 10× magnifiers 7 onto a surface 9 which collects the heat to be utilized. Ventilation can be used to further distribute the heat being conveyed from the source 6. Distances from the source to the lenses and the lenses to the collecting materials are based on best practice use of the focal point of the lens assembly being utilized.

Figure 3:
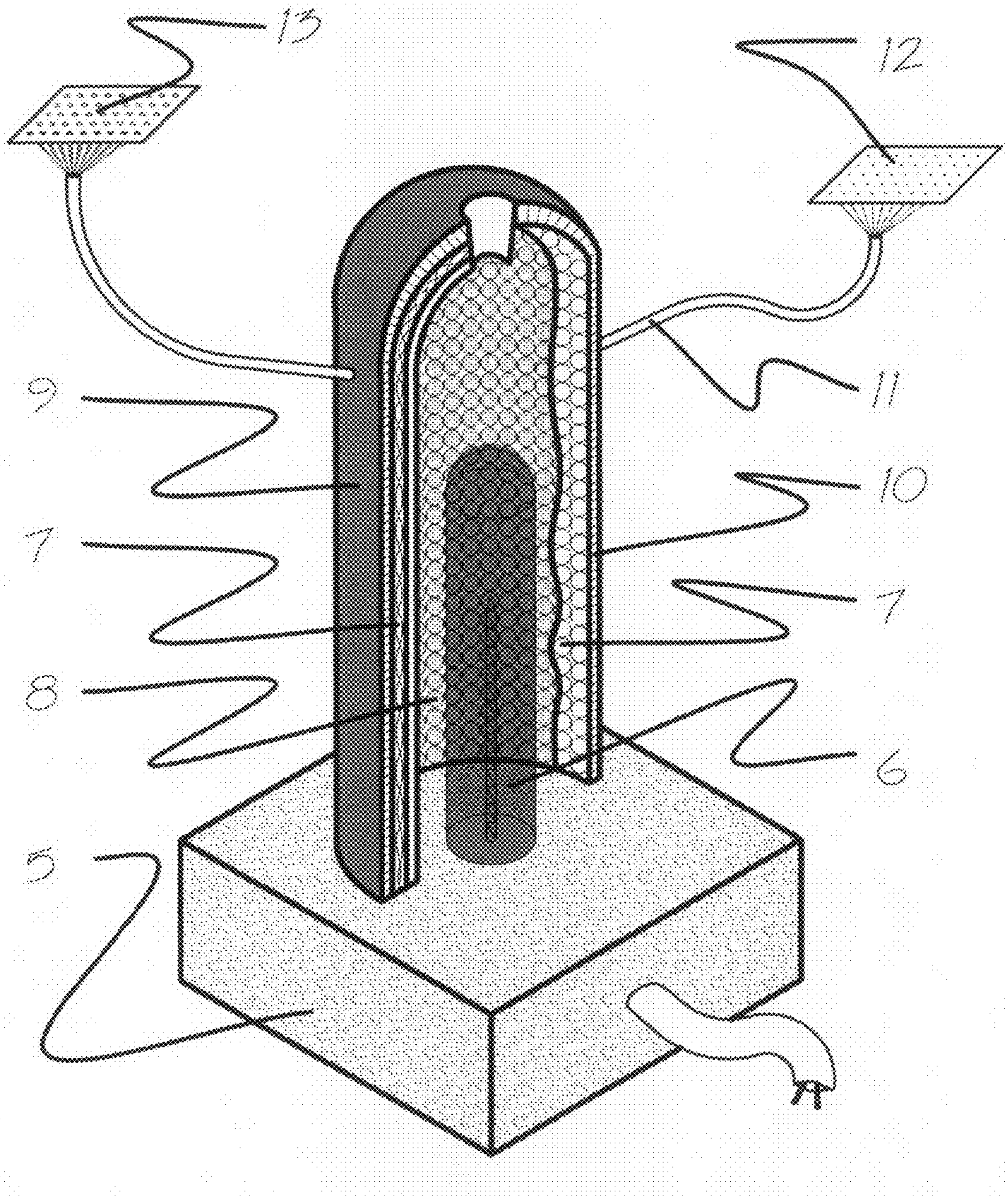
FIG. 3 illustrates a further advanced version of the apparatus using fiber optics.

FIG. 3 In this embodiment the base 5 supplies the required voltage to the thermal radiation producing source 6. The light from the source 6 is then concentrated through many assembled Fresnel lenses 8 then further condensed through a lens assembly 7. The thermal radiation light is then transferred through optical fibers 10 directly onto the heat collecting surface 9. Between the lens assembly 7 and the outer surface 9 various medium can be heated. The light is also able to be conveyed through fiber optic cables 11 to remote collecting and utilization systems 12 and 13. 12 uses multiple fibers to spread the heat and light onto the collecting surface which is derived from a single point of concentrated light at the source. 13 uses a fiber that gradually gets larger at its end and point of use. This makes it possible to increase the surface area of the heat and light being conveyed from the source. In all of the above examples, modifications can be made by one skilled in the art. Metal, air and water are a few of many medium that can be utilized in heat transfer. Ventilation, pumps, and natural dispersion, are means of further transfer of the heat produced. For example, removing the collecting surface 9 would allow for the heat dispersion and the light to be utilized as well.

CONCLUSION, RAMIFICATIONS, AND SCOPE

Accordingly the reader will see that this invention will produce heat wherever electricity is available using a wide range of alternating and direct current voltages. It can provide heat in residential, commercial, and industrial buildings. It can provide heat in any mobile vehicles that can produce the voltage necessary for operation. This invention can be made into many different forms for a variety of applications.

With respect to the above descriptions then, it is to be realized that the parts of the invention can include variations in material, size, shape, form, function and manner of operation, assembly and use. These variations and use should be obvious to one skilled in the art. The embodiments illustrated are intended to disclose the spirit and substance of the invention and are not intended to be limiting.

While the above descriptions contain much specificity, this should not be construed as limitation of the scope of any embodiment, but as exemplifications of the presently preferred embodiments thereof. Many other ramifications and variations are possible within the teachings of the various embodiments. Thus the scope of this invention should be determined by the appended claims and their legal equivalents and not by the examples given.

I claim:

1. An apparatus consisting of a base providing a source of electrical voltage, a housing for housing a lamp comprising a heat collecting surface, said housing also housing an array of concentrating lenses, said lamp interconnected with a voltage source in said base such that the lamp produces thermal radiation within the housing, said thermal radiation being condensed/focused through said array of concentrating lenses to produce elevated temperature heat on the heat collecting surface, whereby the surface area of the condensed thermal radiation is transmitted and extended by means of an optical fiber system that concentrates the thermal radiation into multiple single optical fibers which gradually get larger at their end to increase the surface area of the source.

2. The device cited in claim 1 whereby the condensed thermal radiation is transferred directly onto a heat collecting surface or chamber to heat various mediums including water and air, whereby said mediums with elevated temperature can be transmitted through a heat distribution system.

* * * * *